Sept. 23, 1952 M. T. LYBROOK ET AL 2,611,842
TURN INDICATOR
Filed Jan. 9, 1950 2 SHEETS—SHEET 1
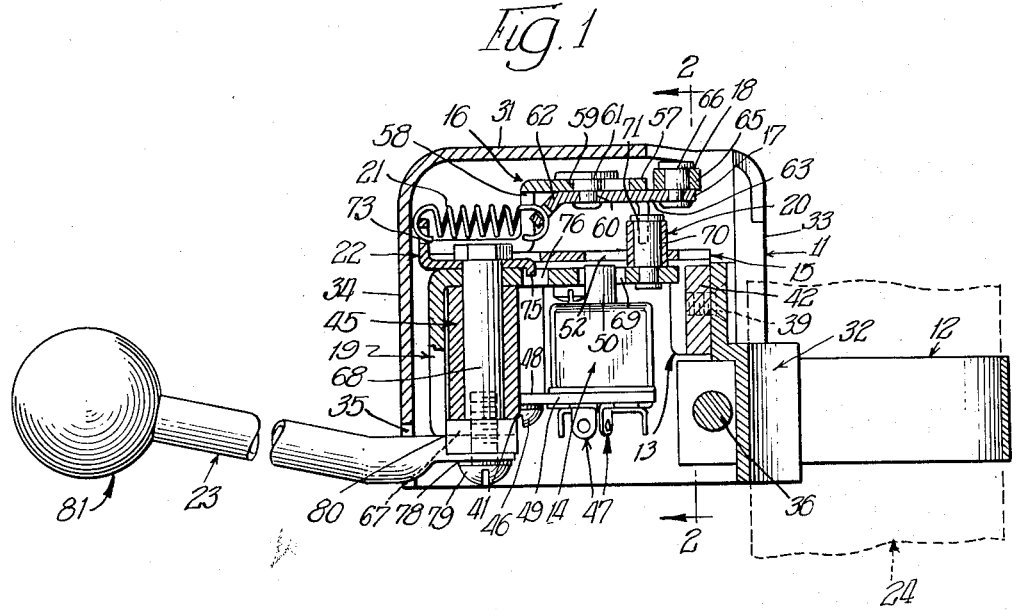
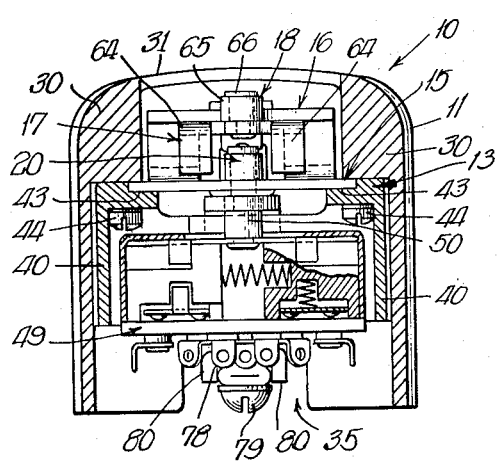
INVENTORS
Malcolm T. Lybrook,
BY Harold H. Clayton,

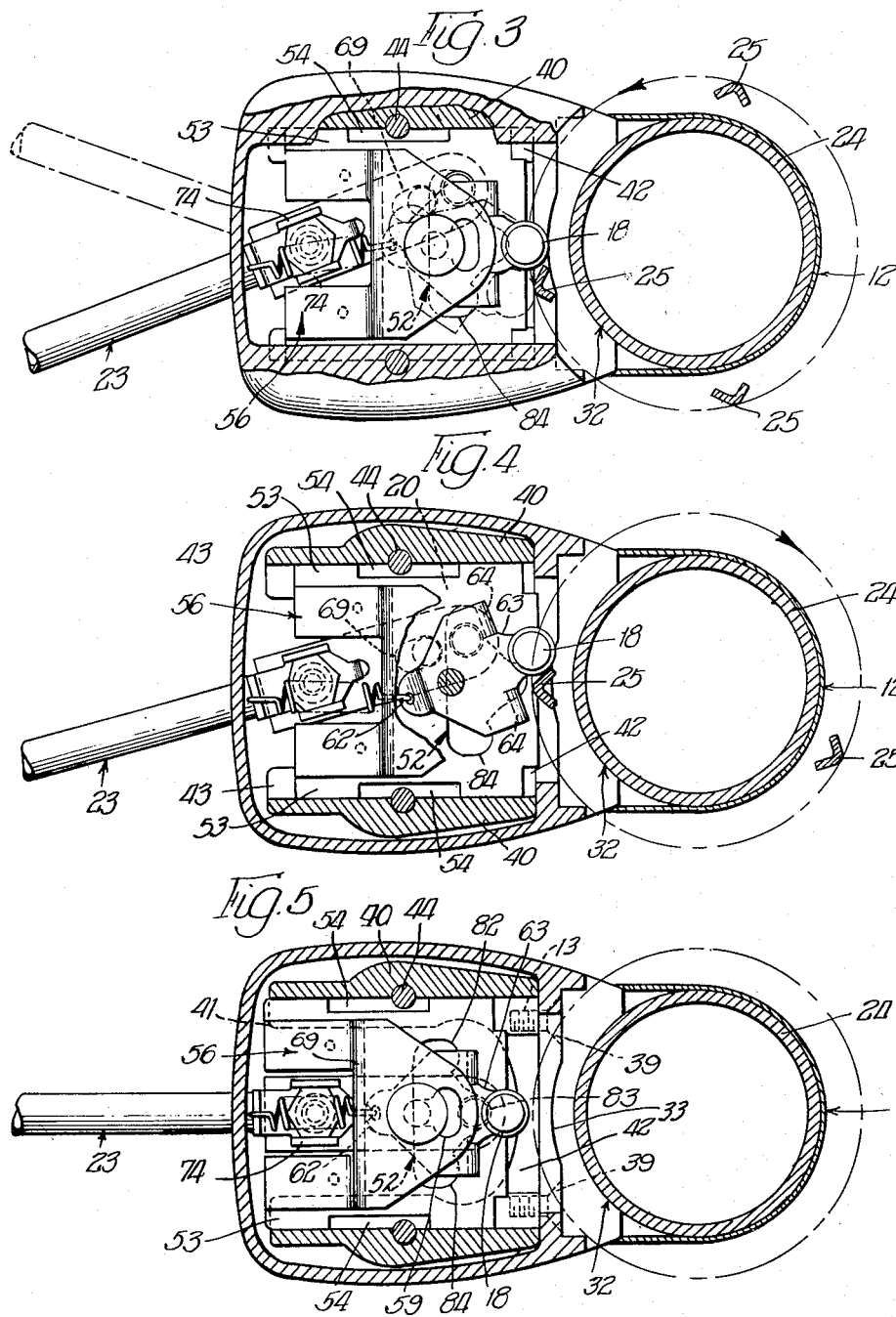

Patented Sept. 23, 1952

2,611,842

UNITED STATES PATENT OFFICE 2,611,842

TURN INDICATOR

Malcolm T. Lybrook and Harold H. Clayton, Logansport, Ind., assignors to Essex Wire Corporation, Logansport, Ind., a corporation of Michigan Application January 9, 1950, Serial No. 137,599

8 Claims. (Cl. 200—59)

Our invention is primarily concerned with a turn indicator attachment adapted for mounting on the steering column of an automobile or like motor vehicle.

More particularly, our invention is directed to a new and improved indicator apparatus capable of indicating the turning movements of an automobile or the like and automatically returnable to a neutral non-indicating position in response to the turning movements of the automobile's steering wheel.

Briefly, we have devised a new and simplified mechanical turn indicator capable of ready installation or removal and of the type adapted to initiate a conventional turn indicator switch and associated flashing light circuits to indicate the turning movements of an automobile or the like.

One of the main objects of our invention is to provide a mechanical turn indicator capable of manual initiation to indicate right, left, and non-turning movements of an automobile or like vehicle.

Another important object of our invention is to provide novel mechanical signal cancelling means whereby our turn indicator will be automatically deactivated in response to a return of the vehicle's steering wheel to a neutral or non-turning position.

Another object of our invention is to provide means whereby the turning indicator may be manually maintained in a turn indicating position irrespective of the automatic signal cancelling impulse initiated by the return of the steering wheel to a neutral position without causing damage to our indicator apparatus.

A still further object of our invention is to provide resilient mechanical means whereby our indicator may be mechanically initiated to indicate a turning signal contrary to the turning movement of the vehicle's steering wheel without damaging the indicator apparatus.

Another object of our invention is to provide means for automatically cancelling a manually initiated turning signal if that signal is contrary to the turning movement of the vehicle.

These and further objects will appear from time to time as the following specification and description proceeds.

Now in order to acquaint those familiar with this art with the method of constructing and utilizing our invention, reference is made to the accompanying drawings, in which:

Figure 1 is a side elevational partial cross sectional view of a turn indicator mechanism made in accordance with the dictates of our invention;

Figure 2 is a front elevational partial cross sectional view of the turn indicator taken substantially along line 2—2 of Figure 1;

Figure 3 is a top plan cross sectional view of our turn indicator showing it in operative position to indicate "left" turn, with the top of the housing removed and mounted to the steering column of an automotive vehicle;

Figure 4 is a cross sectional plan view similar to Figure 3 showing the operation of the cancelling feature of our invention upon return of the vehicle's steering wheel to a neutral position; and Figure 5 is a top plan cross sectional view similar to Figures 3 and 4, showing our turn indicator in a neutral or non-turn indicating position.

Referring now to Figures 1 and 2 of the drawings, the turn indicator indicated generally at 10 therein, comprises an outer protective housing 11, a mounting ring 12, an inner frame member 13 for supporting a signal switch 14, and various actuating linkages including a slide cam plate 15, a bridge plate 16, a cancel finger plate 17 with a cancel finger 18 mounted thereon, a cam roller arm 19 mounting a cam roll 20, and a return spring 21 interconnecting the cancel finger plate with a return spring plate 22. An operating lever 23 initiates the above linkages manually and the entire indicator is mounted to a steering column 24 of an automotive vehicle by the mounting ring 12. The steering column is mounted in a conventional manner below a suitable steering wheel, not shown, having projecting cams 25 depending therefrom for deactivating the turn indicator in response to the rotational movements of the steering wheel as will presently appear. For clarity of understanding our invention we shall describe each of the above elements as they appear in the above listed sequential order, along with their function and association with one another.

The housing 11 as seen in Figures 1 and 2, is characterized by a hollowed out interior to form a cup-shape casting. The cross sectional view Figure 2 reveals a pair of depending shoulder portions 30 formed along the top wall of the hollowed out interior of the housing. A semi-cylindrical external steering column receiving projection 32 extends from a forward wall 33 of the housing and is positioned at the lower edge thereof, being characterized by a concave surface adapted to receive a part of the cylindrical surface of the steering column 24 of the vehicle. A back wall 34 of the housing is provided with a suitable slotted opening 35 along its lower lateral edge adapted to receive the operating lever 23 therethrough for arcuate shifting movement.

The mounting ring 12 is received by suitable slotted openings in the external column receiving projection 32 of the housing, not shown, and is adapted to surround the steering column of the vehicle for clamping action thereabout, being held thereto by means of a suitable tie-bolt 36 inserted laterally across the lower interior of the housing 11, adjacent the forward wall 33 of the housing, as is shown clearly in Figure 1.

The inner frame 13 comprises a single metal casting conforming with the interior contour of the housing 11 whereby the inner frame may be conveniently mounted within the hollowed out interior of the housing. Means for holding the inner frame securely to the housing comprises a pair of holding screws 39 insertable through the forward wall 33 of the housing, adjacent and above the mounting position of the mounting ring 12, as seen in Figures 1 and 5. The inner frame, like the housing, is preferably characterized by a hollowed out interior, leaving relatively thin cross sectioned side walls 40 and rear and front end walls 41 and 42 respectively. The side walls 40 are further distinguished by the channelled recess 43 running longitudinally along their upper edge for receiving the sliding cam plate 15 thereon for lateral sliding movement, as will appear presently herein. Holding studs 44 are insertable through the upper slide channels 43 to be received in suitable openings provided in the depending shoulders 30 of the housing 11 for further securing the inner frame to the housing. The rear end wall 41 adapted to be positioned adjacent the back wall 34 of the housing, opposite the mounting ring and steering column is distinguished by a vertical bearing column 45 comprising a cylindrical re-entrant exterior face integrally cast with the inner frame, and adapted to receive suitable mounting means for the operating lever 23 as will appear presently herein; the bearing column being preferably hollowed out to form a vertical cylinder as is seen clearly in Figure 1 of the drawings.

Suitable vertical openings are provided near the bottom of the rear end wall 41 of the inner frame adjacent the bearing column on the opposite side of the rear end wall thereof for the reception of a pair of mounting screws 46 adapted to secure the signal switch 14 to the inner frame. The signal switch, as herein displayed, is similar to a directional signal switch disclosed in the earlier application of Harold H. Clayton, entitled "Switch," Serial No. 652,674, filed on March 7, 1946, and is distinguished by suitable terminal connectors 47 depending in circuit lead connecting positions laterally across the hollowed out interior of the inner frame and over the open bottom thereof. The mounting screws 46 are suitably inserted through mounting ears 48 extending from a bottom plate 49 of the signal switch, for conveniently fastening the switch in a position whereby its protruding vertically disposed switch post 50 is in suitable receiving position for actuation by the cam arm 19, and below the sliding cam plate 15. The signal switch is adaptable for energizing right turn, left turn and neutral signal circuits in a manner similar to that disclosed in the Harold H. Clayton application Serial No. 652,674 of reference, and therefore will not be discussed further herein. However, it may be pertinent to state that the signal switch is operable according to the positional movements of the laterally movable switch post 50 for actuating the desired turn signal circuit connected to flashing lights disposed normally at both the front and the rear of an automotive vehicle.

The slide cam plate 15 is substantially rectangular in shape and is adapted for sliding movement along the two channelled slide recesses 43 disposed along the upper edges of the side walls of the inner frame as previously described. The slide cam plate has a clover leaf shaped cam aperture 52 formed therein near one end, which is shown herein located adjacent and above the front end wall 42 of the inner frame. The camming aperture is adapted for reception therein of the cam roller 20 integrally associated with the cam roller arm 19, the actuation of which arm to move the cam roller in various positions along the cam aperture of the cam plate, determines the right, left or neutral actuation of the turn indicator, as will appear presently herein under the use and operational description. The inner end of the cam plate, or that end adjacent the bearing column is distinguished by a pair of bifurcated arms 53 disposed in spaced relation along the sides thereof to provide a central opening which allows the sliding cam plate to clear the bearing column as it is actuated along the slide channelled recesses with lateral reciprocating movement. The lateral edges of the slide cam plate have clearance indentations 54 disposed therealong whereby the cam plate will clear the two inner holding studs 44 extending upwardly between the inner frame and the housing.

The bridge plate 16 is adapted for mounting adjacent and above the sliding cam plate and is preferably welded thereto by spot welds disposed along a pair of bifurcated arms 56 registering with the rear bifurcated arms 53 of the slide cam plate. The bridge plate has an offset upper platform 57 formed integrally with the rearwardly extending bifurcated arms 56 and parallel thereto, interconnection being by an offsetting rib member 58 of the bifurcated arms disposed at right angles to the arms on the platform. A T-shaped pivot hole 59 is disposed centrally of the offset upper platform for reception of a suitable connecting member between the bridge plate and the cancel finger plate 17.

The cancel finger plate 17 is mounted directly below the bridge plate having a pivot hole 60 disposed centrally thereof for reception of a pivot rivet 61 adapted to allow pivotal movement of the cancel finger plate relative to the bridge plate thereabout. A rearwardly and downwardly bent spring retainer projection 62 is provided on the cancel finger plate for connection with the return spring 21. The forward end of the cancel finger plate is distinguished by a narrow arm 63 adapted for mounting of the cancel finger 18; the areas of the cancel finger plate adjacent the extending arm 63 being provided with a pair of depending contact arms 64 adapted to project downwardly to contact the cam roller 20.

The cancel finger 18 as shown herein comprises a rotatable collar 65 mounted in an upwardly projecting position on the arm 63 of the cancel finger plate by a rivet 66 in a conventional manner. Contact of the cancel finger by the depending cams 25 associated with the steering wheel acts to cancel the turning signal as will presently appear herein. As is seen in Figure 2, the depending contact arms 64 are separated to lie vertically on either side of the upwardly extending cam roller 20 mounted on the cam arm 19 when the turn indicator is in its neutral operating position. The cam arm 19 comprises a rectangular metal finger having two right angle bends therein for adapting the cam arm to extend vertically along the outer-reentrant face of the bearing column, across the upper edge of the end wall 41 of the inner frame, and across the lower end of the bearing column 45, to form a lower mounting platform 67 having a suitable aperture therein for reception of mounting connection between the operating lever 23 and a mounting post 68 at the lower end of the bearing column. The mounting post 68 having a hexaganol upper head, is insertable through a suitable opening in the upper extending portion of the cam arm to be received and journalled in the cylindrical interior of the bearing column, as is seen clearly in Figure 1, to pivotally tie the cam arm to the bearing column. The cam roller 20 is mounted in a vertical upwardly projecting disposition at the inner end of the cam arm, and a slotted aperture 69 is disposed about midway of the upper portion of the cam arm for reception therein of the switch post member 50 of the directinal signal switch whereby lateral arcuate movement of the cam arm in response to the directional movements of the operating lever will cause rectilinear lateral movement of the switch post.

The cam roller 20 comprises a cylindrical rotatable collar 70 mounted on a rivet post 71 rigidly secured to the inner end of the cam roller arm by suitable upsetting of the ends thereof in a manner conventional in the art. In its mounted position on the cam roller arm, the cam roller 20 projects vertically up through the camming aperture of the slide plate and extends to a position below, but behind, the cancel finger 18. Lateral movement of the cam roller across the camming aperture disposed in the slide plate as pointed out before, causes responsive sliding movement of the sliding cam plate 15 and cancel finger plate 17, a more detailed description of which will appear herein under the use and operational description of the turn indicator.

The cancel finger 18, as previously noted, is vertically mounted for rotational movement on the cancel finger plate 17, having connection with the return spring 21 by means of the depending spring retainer 62. The return spring is additionally mounted to a return spring plate 22, located at the top of the bearing column 45 above the cam roller arm and mounted on the upper end of the mounting post 68. The return spring plate 22 is characterized as shown herein by an upwardly projecting spring retaining ear 73 at its rearward extremity; the ear having a suitable opening therein for receiving one end of the spring 22 in a manner similar to its connection with the depending spring retainer of the cancel finger plate 17. The mounting post 68 is adapted to be received in a suitable opening in the return spring plate, the areas of the plate adjacent this opening being upwardly turned to form a pair of locking lugs 74 capable of enclosing two opposite sides of the hexagonal head of the mounting post 68 whereby that post is locked in its rotative position in bearing column 45. A downwardly turned positioning lug 75 is provided at the forward end of the spring retaining plate adapted to engage a suitable slotted aperture 76 formed adjacent thereto in the cam roller arm; whereby means is provided for locking the spring retaining plate in its position atop the cam roller arm.

The operating lever 23 is shown herein as comprising a cylindrical shaft having a flattened platform 78 at its inner end adapted for the receipt of a suitable mounting screw 79 therethrough; said screw being capable of insertion through the mounting platform of the operating lever and projecting upwardly into the mounting post disposed inside of the bearing column for threading engagement therewith. Means for maintaining the operating lever in its desired position relative to the cam roller arm 19 is provided, whereby in the neutral position of the turn indicator, the lever extends substantially at right angles to the back wall 34 of the housing, and in line with the cam roller arm. Such retaining means comprise a pair of depending locking ears 80 contiguously formed as a continuation of the lower mounting platform of the cam arm 19. These depending lugs lie adjacent to the mounting platform of the operating lever to hold that lever in vertical alignment with the cam roller arm whereby the two are assured of responsive and identical movement with one another, this type of connection making the cam roller arm substantially a rigid continuation in offset relation with the operating lever. If desired, a suitable gripping knob 81 may be provided at the outer end of the operating lever to facilitate manual operation of that lever.

As mentioned previously, the mounting ring is adapted for mounting the turn indicator to the steering column 24 of the motor vehicle, in the manner displayed in Figures 3 through 5 of the drawings. In this connection it should be noted that actuating cams 25 are herein shown as angularly bent ears suitably fastened to the lower extremes of the steering wheel, not shown, for automatic actuation of the turn indicator in response to the turning movements of the vehicle. It might further be noted that the inner frame with the various parts previously described, is assembled as a unit and is capable of unitary removal from the outer housing by the expedient of removing the mounting screws 39 and holding studs 44.

*Use and operation*

The use and operation of the turn indicator as described above is illustrated in a typical cycle by Figures 3 through 5, wherein it will be observed that Figure 3 represents the position of the various linkages when the turn indicator is pulled downwardly to indicate left turn, the desired mounting position of the turn indicator being such that it projects at right angles to the steering column from the left hand side thereof, as viewed by the driver.

Depression of the turn indicator lever 13 carries the cam roller 20 to a left turn camming detent 82 formed integrally as a part of the clover leaf shaped camming aperture 52 of the slide plate. Such a manual movement of the cam roller arm 19 to the position shown in Figure 3, causes the slide plate, bridge plate and pivotal cancel plate to be resiliently thrust to the right of their Figure 5 position into an interfering position whereby the cancelling finger is in interfering relation with the counterclockwise path of movement of the cams 25 depending from the steering wheel of the vehicle. In this position the return spring 21 is in an expanded tensioned condition tending to maintain the cancel finger plate at a position normal with the steering column of the vehicle. As the depending cams 25 are moved counterclockwise by the left turning motion of the steering wheel, they meet periodically the interfering cancel finger, but are allowed to override that finger due to the resilient operation of the return spring 21 which permits swivelling of the cancel finger plate about its pivot rivet 61 so that the cancel finger periodically moves to the position shown by dotted lines in Figure 3 under the intermittent impulse of the cams 25. Upon clockwise rotation of the steering wheel, as viewed in Figure 4, it will be observed that the depending cams 25 contact the opposite face of the cancel finger tending to rotate the cancel finger plate counterclockwise about its pivot rivet 61. Such actuation of the cancel finger plate forces the nearest depending contact arm 64 to disengage the cam roller from the left turn cam position by that arm attempting to override the cam roller which causes further expanding of the return spring, which in turn, urges the slide plate to move toward the steering column. Upon disengagement of the cam roller with the left turn cam position, the cam roller follows the camming surface of aperture 52 to a neutral central non-indicating cam position 83 whereby the linkage is returned to its neutral starting position as shown in Figure 5 of the drawings. Manual elevation of the operating lever to indicate right turn causes a converse actuation of the linkages in the manner as described above, the cam roller engaging the right turn position detent 84 and being disengaged upon counterclockwise rotation of the steering wheel as the steering wheel returns to a non-turning position upon completion of a right turn.

In accompaniment with the depression and elevation of the operating lever to indicate left or right turn as desired, it will be noted that the operating switch post 50 of the directional signal switch, is moved correspondingly to its right or left turn indicating position by the manual operation of the operating lever, thus providing a manual initiation of the turn indicating system with an automatic return to a neutral non-indicating position in response to returning motion of the steering wheel to a neutral straight flight condition. It should be noted further that upon the actuation of the cancelling finger causing the disengagement of the cam roller from its right or left turn position in the cam aperture 52, the return spring being in a tensioned state, acts to return the slide plate and accompanying linkage to the neutral and non-indicating position, where the cancelling finger is removed from interference with the path of movement of the depending cams 25 as they are moved in a circular path by turning motion of the steering wheel.

It might also be pertinent to note that if the operating lever is manually initiated to a position whereby the signal switch is actuated to energize a turning signal circuit contrary to the turning motion of the motor vehicle, that is to say, if the automobile is turning left and the operating lever is elevated to indicate right turning, automatic cancellation of the erroneous signal will occur by virtue of the depending cams contacting the cancelling finger with a cancelling pressure in response to the initial turning movement of the steering wheel, the same as if the signal had been properly initiated and the steering wheel was in the process of cancelling the signal by being returned to its neutral straight flight position.

It is also important to note that if perchance, the operating lever is manually held in opposition to the returning pressure of the return spring and the depending cams 25 have contacted the cancelling finger to cancel the signal, no injury to the apparatus will occur. This may be better understood by an illustration such as is shown in Figures 3 through 4, wherein the operating lever has been depressed to indicate left turn as shown in Figure 3. With the operating lever in the Figure 3 depressed condition and the steering wheel moving clockwise as indicated in Figure 4, whereby the depending cams have contacted the cancelling finger to remove the cam roller from the left turn cam position, as explained heretofore, automatic cancellation of the turning signal will normally ensue, unless the operating lever is being held down by some pressure such as the weight of the operator's hand. Such a restraint of course, is contrary to the resilient tensioned force exerted by the return spring on the turn indicator linkage to result in cancellation of the turn indicator signal. If the linkage were rigidly interconnected, the above described situation would result in the depending cams forcing the cancelling finger against the pressure exerted by the operator's hand and would probably cause severe damage to the linkage, unless the restraining pressure were released. However, the cancel finger plate being swivelly mounted on its pivot rivet and restrained in its rotational movement only by the return spring, allows the contact arms to override the cam roller by sliding movement of the cancel finger plate and its pivot rivet along the T-shaped pivot hole 59. The cam roller however, will still be in engagement with the left hand turn cam position of the sliding cam plate, that is to say, it will be in the position shown in Figure 4, where it has not entirely been removed to the neutral Figure 5 position. In this described condition then, the depending contact arm 64 which under normal conditions would tend to force the cam roller out of the left hand turn cam depression 82, will have passed beyond the cam roller in rolling contact with the collar 70 thereon, and although the sliding cam plate may have moved forward so that the cam roller is in its Figure 4 position, the linkage and operating lever will not have returned to its neutral, normal, non-indicating position of Figure 5, due to the restraint exerted by the operator's hand or the like. Return of the operating lever to Figure 5 position will, however, occur upon the removal of restraining force on that lever, due to the resilient returning pressure exerted by the return spring; the cancel finger plate snapping back to its normal position during the return of the operating lever to the Figure 5 position. Note, that if the operating handle 23 is held firmly in indicating position until the pivot rivet 61 enters a lateral detent in the T-shaped hole 59 and the restraining force then removed, the cancel finger plate will return to Figure 3 position when the steering wheel cam 25 passes the cancelling finger 18.

Thus, it may be seen that we have provided a new and improved turn indicator apparatus adaptable for selective installation on automotive vehicles or the like and capable of manual initiation at the will of the operator to indicate either right or left hand turning motion of the automobile. Additionally, certain safety devices for preventing damage to the indicator have been embodied, comprising the ability of the turn indicator to automatically cancel a false turning signal and its ability to withstand an abnormal restraining pressure of the operating lever contraposed to the automatic return feature of the indicator in response to returning motion of the steering wheel to a straight level flight position.

While we have herein shown one preferred embodiment in which our invention may appear, it will be readily understood that the use of equiva-

We claim:

1. A mechanical turn indicator apparatus for use in automotive vehicles or the like, comprising in combination, an outer housing mounting said apparatus, a mounting ring extending through said housing for connecting the apparatus to the vehicle's steering column, a unitary inner frame insertably mounted within said housing, an operating lever pivotally connected at one end to said inner frame and extending outwardly of said housing for arcuate manipulation, a cam roller arm mounted to the inner end of said lever and arcuately movable therewith, said arm having an oblong opening formed therein, a directional signal switch positioned below said arm and having a rectilinearly movable operating post extending into the oblong opening in said arm whereby arcuate movement of said arm causes responsive rectilinear motion of said post to actuate said switch, a cam roller rotatably mounted at the inner end of said arm and extending upwardly therefrom, a cam plate slidably mounted above said arm and having a cam opening with three positional detents formed therein, said cam roller extending into said cam opening for rolling engagement with said positional detents thereof, and a spring member biasing said cam plate toward said roller thereby to resiliently engage the same with said cam opening's positional detents whereby arcuate manipulation of said lever causes said roller to move along said cam opening and rectilinearly move said cam plate against the bias of said spring with the successive engagement of said roller with each of the positional detents serving resiliently to hold said switch in a preselected operating condition.

2. A detachable turn indicating apparatus adapted for ready installation on automotive vehicles or the like, comprising a unitary inner frame, an operating lever pivotally mounted to one end of said frame, a cam roller arm rigidly joined to said lever and pivotally mounted to said frame by pivotal connection common with said lever whereby said lever and arm have a common vertical pivotal axis, a vertical cam roller disposed at the opposite end of said arm from its juncture with said lever, a directional signal switch disposed below said arm and mounted in said frame, said switch having a vertical switch operating post projecting upwardly therefrom to be received in a suitable oblong aperture formed in said overhanging cam roller arm to thereby form an operative connection with said arm whereby said post is rectilinearly moved in response to arcuate movement of said arm and lever, a sliding cam plate disposed above said arm and adapted for reciprocal sliding movement along suitable channelled recesses formed along opposite upper edges of said frame, said plate having a cam opening, distinguished by three positional detents, formed therein adapted to receive said cam roller whereby said plate will be actuated along said channelled recesses in response to arcuate movement of said operating lever, cam roller arm and cam roller with said detents serving to maintain said lever, arm and switch in right turn, left turn, or neutral positions according to the selected positional engagement therewith of said roller.

3. A detachable turn indicating apparatus for installation on the steering column of an automotive vehicle or the like, comprising an inner frame characterized by a hollowed-out interior and a vertically disposed bearing column positioned on one end wall thereof, an operating lever pivotally connected to one end of the bearing column, a cam roller arm pivotally mounted to the both ends of said bearing column and rigidly joined to said lever whereby said arm will move in an arcuate path about said column in response to arcuate movement of said lever, both said arm and lever moving about their common pivotal axis in the same circular direction, said arm overhanging the hollowed-out interior of said frame and said lever extending exteriorly from said frame's end wall; a turn indicating signal switch disposed laterally across said frame within said hollowed-out interior thereof and below said arm adapted to selectively energize right and left turn signal indicating circuits, said switch having a vertically extending switch operating post projecting from its upper wall adapted to be received in an oblong opening formed in said arm, whereby said switch post will move rectilinearly to energize selected directional turn indicating signal circuits in response to manual arcuate actuation of said operating lever; a sliding cam plate positioned above said arm and said switch and adapted for sliding movement along a pair of channelled recesses formed along opposite upper edges of the side walls of said frame, and a cam opening formed in said plate adapted for the reception therein of a cam roller mounted on said cam roller arm whereby said roller arcuately will be moved along the contour of said cam opening to slidingly move said plate toward said vehicle's steering column in response to said manual initiating arcuate movement of said operating lever, said cam opening also having two laterally spaced detents formed in its contour adapted to maintain said cam roller arm at the extremes of its arcuate path of travel along said opening for holding said switch in signal energizing condition.

4. In a directional turn indicator apparatus for indicating turning movements of an automotive vehicle or the like, a hollow unitary inner frame, an outer housing adapted to receive said frame within its hollow interior; a directional turn indicating signal switch, for selectively energizing right and left turn indicating electrical circuits, mounted within said inner frame, a rectilinearly movable operating post mounted to operate said switch; a sliding cam plate disposed between the upper lateral edges of said frame, a cam roller arm disposed between said switch and said plate and having an oblong opening for receiving said operating post, said arm being pivotally mounted to a rear end wall of said frame whereby said operating post is rectilinearly moved in response to arcuate movement of said arm; a rotatable cam roller disposed at the inner end of said arm and projecting vertically upwardly therefrom to be received by a cam aperture formed in said cam plate, said aperture having one central and two lateral detents formed in its contour whereby movement of said roller into engagement with either of said lateral detents causes said cam plate to slide toward said steering column for holding said arm in a position wherein said switch is in a circuit energizing condition; a bridge plate rigidly mounted to and slidable with said sliding cam plate, said bridge plate being characterized by an overhanging upper platform; a cancel finger plate swivelly mounted to said bridge plate and adapted for arcuate movement about a vertical pivotal axis, and a resilient spring associated with said cancel finger plate for resiliently opposing the sliding movement of said sliding cam plate and cancel finger plate toward the steering column of said vehicle and for limiting the arcuate swing of said finger plate.

5. In a directional turn indicator apparatus adapted to be mounted to the steering column of and automotive vehicle or the like, an outer housing for enclosing said apparatus, a unitary inner frame insertable in said housing, a sliding cam plate adapted to oscillate with sliding movement along a pair of recessed channels formed along opposite upper lateral edges of said frame, the movement of said plate being toward and away from said steering column; a cam roller adapted to engage a camming aperture having three separated positional detents formed in said sliding cam plate; engagement of said roller with either of two of said detents serving to slide said cam plate toward said steering column, a cam roller arm associated with said cam roller mounted below said sliding cam plate and pivotally movable about a fixed pivot point on said inner frame; said arm moving said roller arcuately along said cam aperture into one of said three detents as desired, a directional signal switch disposed below said arm and in sliding operative engagement therewith, said switch being operatively responsive to arcuate actuating movement of said arm to energize right and left turn indicating signal lights, a cancel finger plate swivelly suspended above said sliding cam plate and laterally movable therewith, a resilient return spring interconnecting said cancel finger plate with said frame, a cancel finger rotatably mounted on said cancel finger plate adapted to be periodically contacted by a plurality of depending cams associated with the steering wheel of said vehicle; said cancel finger moving into an interfering position with a circular path of movement of said depending cams upon movement of said sliding cam plate towards said steering column; contact of said depending cams with said finger, while said cams are moving in one direction, serving to disengage said roller from either one of said two detents whereby said spring resiliently urges said sliding plate away from said steering column.

6. In a direction signal turn indicator apparatus adapted to be mounted to a steering column of an automotive vehicle, a unitary inner frame adapted to be enclosed by an outer unitary housing, a sliding cam plate mountable on said frame adapted to be moved toward and away from said steering column, a manually operated actuating lever pivotally connected to said inner frame and protruding exteriorly of said housing, a cam roller arm secured in an offset parallel relation to said lever as a rigid extension thereof, a directional turn indicator switch rectilinearly actuated in response to said manual arcuate actuation of said operating lever and arm for energizing selected right or left turn visual signals, connective means between said cam roller arm and said sliding cam plate comprising a three-step cam aperture formed in said cam plate and a rotatable cam roller mounted on said cam roller arm and adapted to engage either one of two of said cam steps for slidingly actuating said cam plate toward said steering column during actuation of said switch by said lever and arm to indicate turning movement of said vehicle, a cancel finger plate swivelly mounted above and slidingly movable with said sliding cam plate adapted to interfere with a circular path of movement of a plurality of depending cams associated with the steering wheel of said vehicle; said cancel finger bypassing said depending cams by resilient swivelling movement of said cancel finger plate during turning rotation of said steering wheel in an according sense with the turning direction indicated by said switch, and depending bifurcated arms associated with said cancel finger plate adapted to disengage said cam roller from its selected turn indicating cammed position in said cam aperture during returning rotation of said steering wheel in a direction opposite to said turning direction indicated by said switch to thereby cancel said signal circuit being energized through said switch.

7. In a turn indicator adapted for mounting on the steering column of an automotive vehicle or the like, an outer housing adapted to be mounted to said steering column at right angles thereto, a unitary inner frame mountable within said housing, an operating lever pivotally mountable to said frame and adapted to project through said housing for convenience of manual manipulation, a directional signal switch operatively controlling right and left turn indicating visual signalling devices associated with said vehicle, said switch adapted to be initiated to closed circuit position in response to arcuate movement of said operating lever; a cam roller arm rigidly connected to said lever and extending within said housing as an offset continuation thereof, a sliding cam plate mounted on said inner frame for sliding reciprocation along a path normal to the axis of said steering column, said cam plate being characterized by a camming aperture formed therein distinguished by a camming profile having two turn indicating and one neutral non-turning offset steps therein; a cam roller projecting upwardly from said cam roller arm through said camming aperture and adapted for rolling movement along said camming profile thereof, said camming aperture and roller acting to hold said operating lever, associated cam roller arm, and turn indicating switch in turn indicating position subsequent to manual initiation of said roller to one of said turn indicating steps, and said camming aperture and roller also acting to control said sliding movement of said cam plate toward said steering column during movement of said roller to one of said turn indicating steps; and a resilient return spring associated with said sliding cam plate for holding said camming aperture in resilient close contact with the surface of said cam roller and additionally adapted to oppose said sliding movement of said sliding cam plate toward said steering column.

8. In a directional turn indicator apparatus adapted to be removably installed on the steering column of an automobile or the like for use with an electrical visual turn signal installation in said automobile, a manually actuated operating lever, a direction turn signal switch associated with said lever, a cam roller arm, arcuately movable in response to arcuate movement of said lever, extending between said lever and said switch whereby said switch may be selectively actuated to energize a desired turn signal circuit in response to said manipulation of said lever; a sliding cam plate adapted for reciprocal sliding movement along a path normal to the axis of said steering column, a cam roller mounted on said cam roller arm adapted to engage a pair of turn indicating cam steps in a suitable camming aperture formed in said cam plate whereby said plate will be moved towards said steering column when said roller is moved to either of said cam steps in response to initiation of said operating lever, a bridge plate rigidly mounted to said cam plate and reciprocally movable therewith, a pivotally mounted cancel finger plate secured to said bridge plate, resilient spring means associated with said cancel finger plate for resiliently restraining the rotatiional movement of said cancel finger plate and said sliding movement of said cam plate; a pair of depending arms formed on the inner end of said cancel finger plate adapted to contact said cam roller, and a rotatable cancel finger mounted on said cancel finger plate adjacent said steering column and extending in a vertical direction opposite to said depending arms adapted to interfere with the path of movement of a plurality of depending cams associated with the steering wheel of said automobile upon completion of said movement of said cam plate toward said steering column, said depending cams overriding said cancel finger when said steering wheel is rotated in one direction, but contacting said cancel finger upon rotation of said steering wheel in an opposite direction to thereby cause said cancel finger plate to swivel toward said cam roller so that said depending arms will disengage said cam roller from one of said selected cam steps to cause an automatic return of said apparatus to a neutral non-turning signaling position.

MALCOLM T. LYBROOK.
HAROLD H. CLAYTON.

REFERENCES CITED

The following references are of record in the file of this patent:

UNITED STATES PATENTS

| Number | Name | Date |
|---|---|---|
| 1,947,681 | Stow | Feb. 20, 1934 |
| 2,073,141 | Chaney | Mar. 9, 1937 |
| 2,276,413 | Moore | Mar. 17, 1942 |
| 2,308,108 | Roedding | Jan. 12, 1943 |
| 2,427,595 | Fuller | Sept. 16, 1947 |
| 2,542,242 | Fuller | Feb. 20, 1951 |